Oct. 4, 1960  G. R. McCLOUD  2,955,176
LOAD INTERRUPTER HOUSED FUSE CUTOUTS
Filed Feb. 3, 1959  6 Sheets-Sheet 2
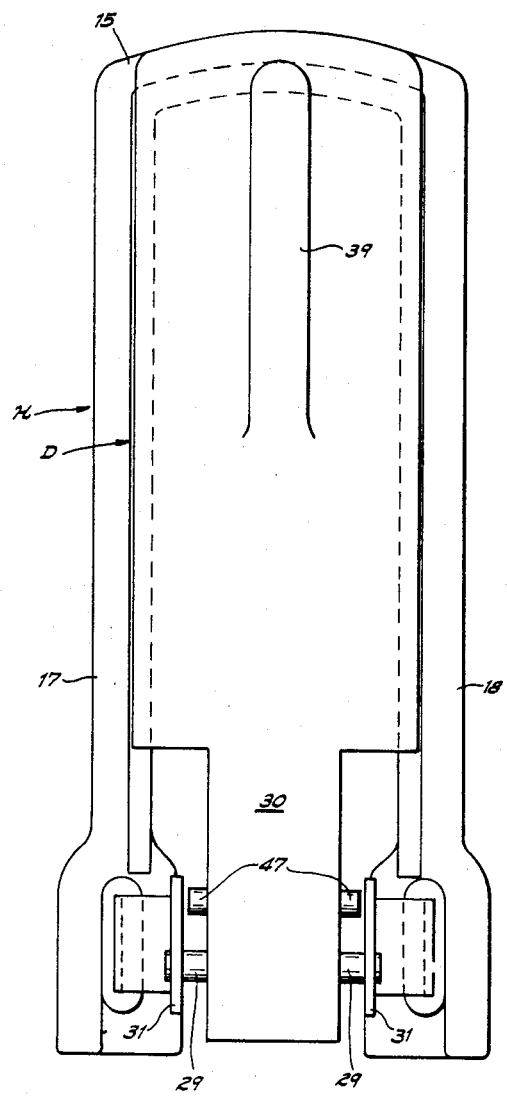
Fig. 2
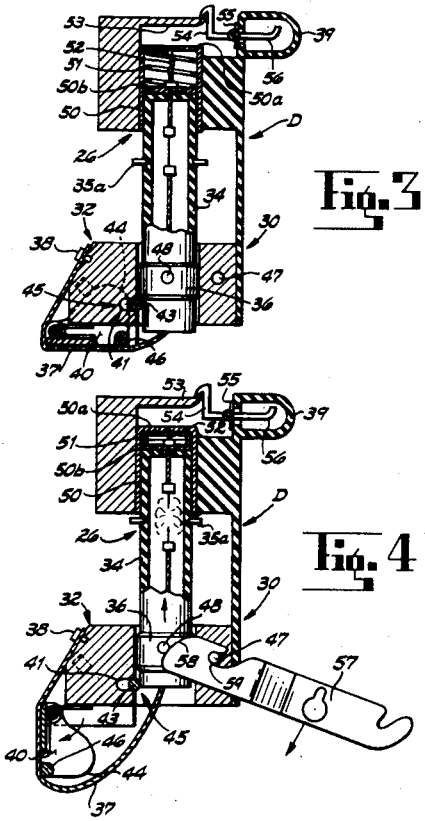
Fig. 3
Fig. 4
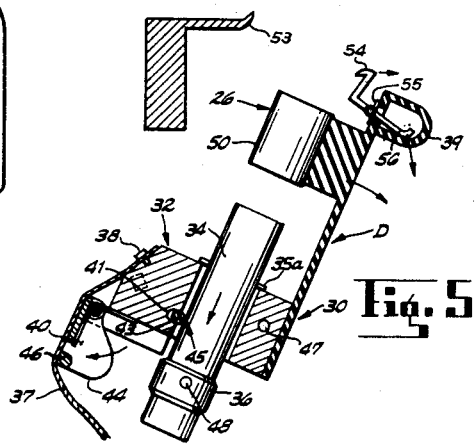
Fig. 5
INVENTOR.
GEORGE R. McCLOUD
BY
ATTORNEY Oct. 4, 1960  G. R. McCLOUD  2,955,176
LOAD INTERRUPTER HOUSED FUSE CUTOUTS
Filed Feb. 3, 1959  6 Sheets-Sheet 3

INVENTOR.
GEORGE R. McCLOUD
BY
ATTORNEY

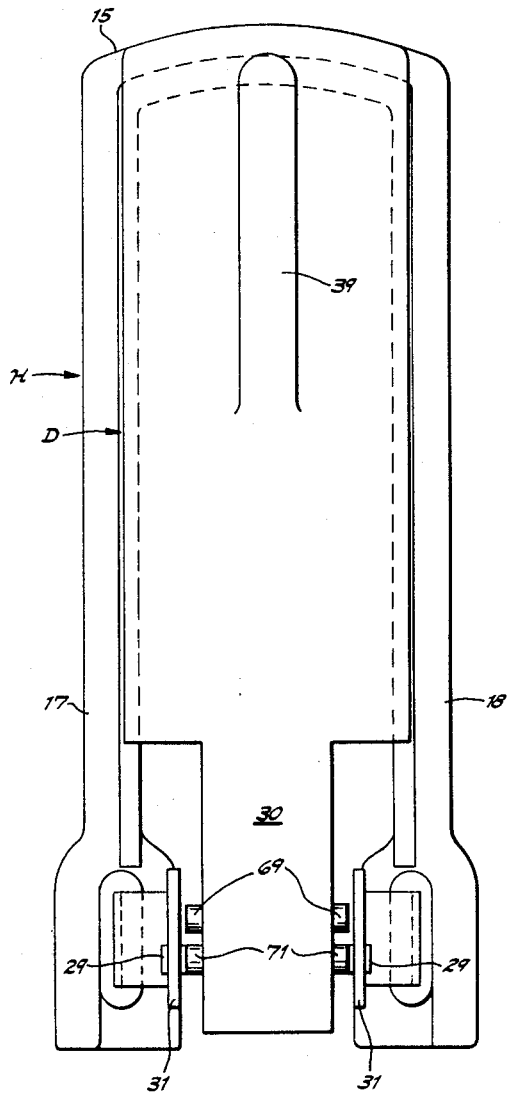
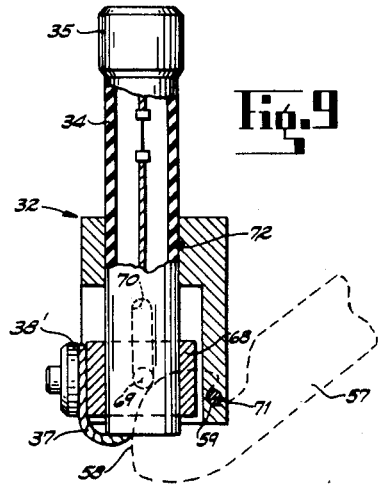
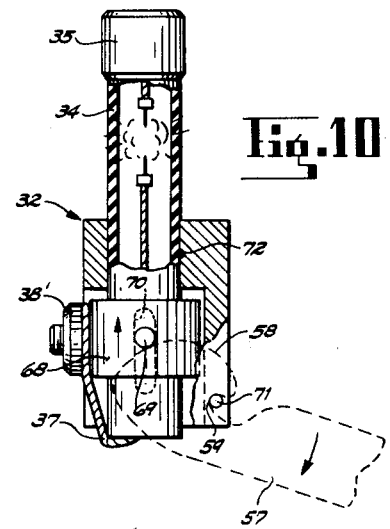

Oct. 4, 1960

G. R. McCLOUD 2,955,176

LOAD INTERRUPTER HOUSED FUSE CUTOUTS

Filed Feb. 3, 1959

INVENTOR.
GEORGE R. McCLOUD
BY
ATTORNEY

United States Patent Office 2,955,176
Patented Oct. 4, 1960

2,955,176

LOAD INTERRUPTER HOUSED FUSE CUTOUTS

George R. McCloud, South Milwaukee, Wis., assignor to McGraw-Edison Company, Milwaukee, Wis., a corporation of Delaware Filed Feb. 3, 1959, Ser. No. 790,851

8 Claims. (Cl. 200—114)

This invention relates to new and useful improvements in a load interrupter fuse cutout and more particularly relates to fuse cutouts of the housed type wherein provision is made for mechanically breaking the fusible elements subject to a load current in an electric circuit.

Usual practice is to provide, in an electrical system, a fuse for interrupting a circuit under overload conditions and in series therewith a circuit breaker which may be manually operated to open the circuit operating under normal load conditions. Theoretically, the fuse can be used as a circuit breaker. However, the fuse contacts are not designed to withstand the destructive effects of arcing, when the contacts are sperated under load.

The principal object of this invention is to provide a housed fuse cutout having a fuse link which will interrupt the circuit under overload conditions and including manually operating means for breaking the fuse link when it is desirable to interrupt the circuit under normal loads; thus dispensing with the use of a circuit breaker in series with the fuse cutout permitting operation of the fuse cutout to open circuit position without producing injurious arcing between the fuse contacts.

Another object of the invention is to provide a housed fuse cutout having therein a fuse tube means which includes a rupturable fuse link, one end of said fuse link being fixedly mounted and the other end being movable to thereby apply sufficient force upon said fuse link to cause rupture of the same and thereby interrupt the electrical circuit.

Another object of this invention is to provide a housed fuse cutout with link break means therein which is selectively actuable, i.e., fuse cutout may be opened with or without breaking the link thereby not causing an unnecessary breaking of a fuse link when the circuit conditions do not require that operation.

Another object of this invention is to provide a housed type fuse cutout wherein the fuse holder is normally latched into closed circuit position and the link break mechanism is freely manually operable during the link breaking operation without disturbing the normally latched condition of the fuse holder, there being a separate latching mechanism for releasing the fuse holder after breakage of the fuse link and for moving the fuse holder to open circuit condition.

Still another object of the invention is to provide, in one embodiment, a housed type fuse cutout in which the door serves as the mechanical advantage imparting operating member for the link break mechanism on opening movement, and as the fuse holding member during circuit closing operation, and during normal operation.

Saying this last object in another manner, it is the intent that the sequence of the door operation be provided when first closure of the door places the fuse in circuit where it remains until the door opens, then opening movement of the door directly operates a link break mechanism without reliance upon spring, etc. to set up a link break mechanism or requiring multi-directional movement of the door.

Still another object of this invention is to provide in another embodiment, a housed fuse cutout wherein the link break means is actuated by a cam surface on a portable tool separate and apart from the housed cutout.

A further object of this invention is to provide a link break housed fuse cutout affording the function of an indicating "drop down" tube or other indicator upon thermal rupture of the fuse link caused by an overload situation to thereby indicate to a lineman that the fuse link has ruptured. The "drop down" of tube serves a dual purpose, one is indication, the other is removal of the fuse tube (usually organic insulation) from the circuit so that it is not exposed to sustained voltage across it which could result in "tracking" and eventual flashover of the cutout.

The novel features which are characteristic of the invention are set forth with particularity in the appended claims. The invention, itself, both as to its organization and its method of operation, together with additional objects and advantages thereof will best be understood by the following description of specific embodiments when read in connection with the accompanying drawings in which:

Fig. 1A is a perspective view of a portable tool adapted to actuate the link break means.

Fig. 2 is a front elevational view of the device shown in Fig. 1;

Figs. 3, 4 and 5 are semidiagrammatic sectional views showing the relative position of the parts of the embodiment shown in Figs. 1 and 2 during sequential operation of the device.

Fig. 8 is a front elevational view of the third embodiment set forth in Fig. 7;

Figs. 9 and 10 are semidiagrammatic views of the embodiment shown in Figs. 7 and 8 showing the relative positions of the parts during sequential operation of the link break mechanism;

Figure 1:
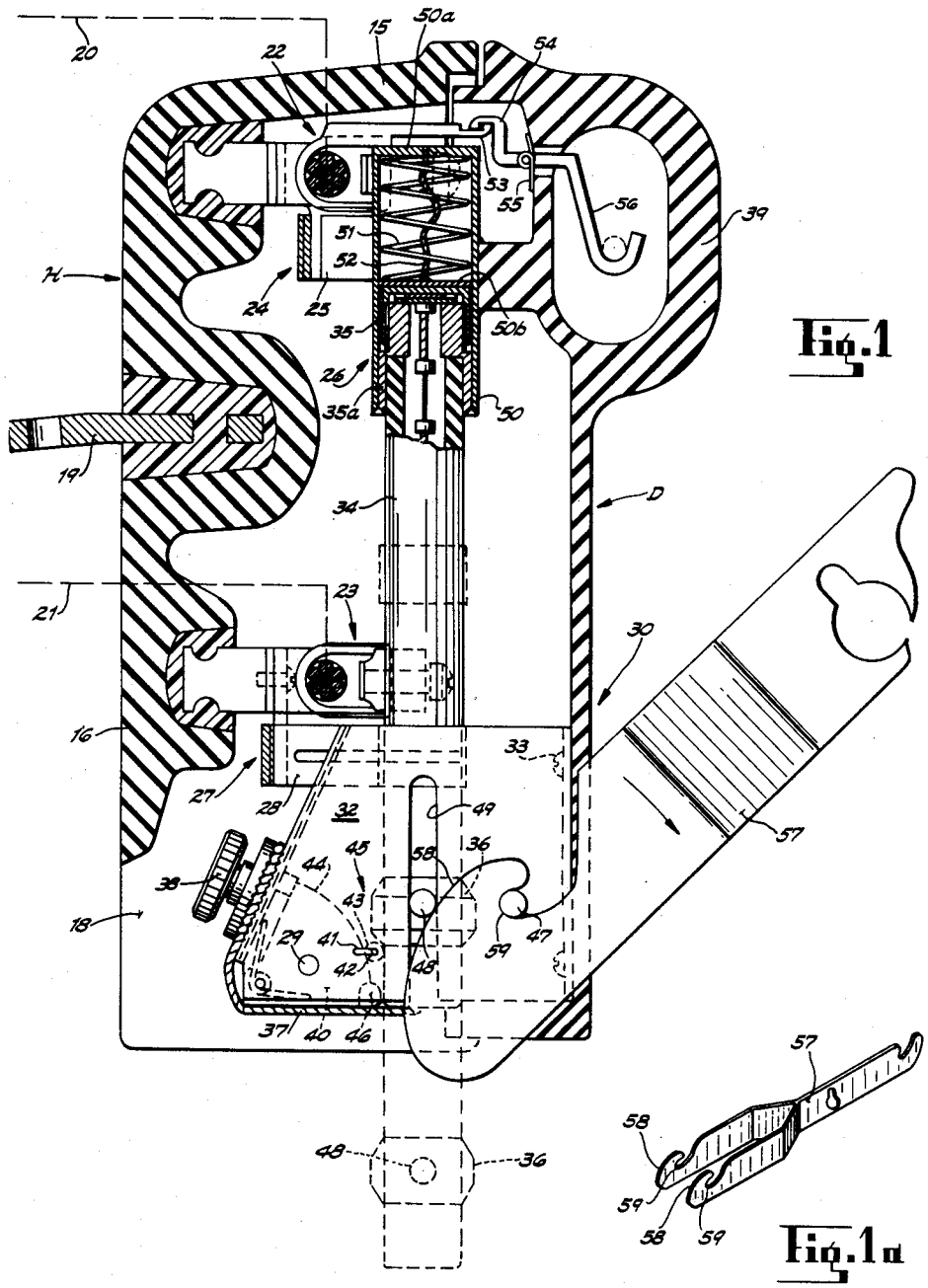
Fig. 1 is a side view, a portion of which is in section, showing one embodiment of the inventive concepts.

Returning now to Fig. 1 of the drawings, this embodiment of the invention comprises a housing H of a housed fuse cutout having an open front and bottom and a door D of insulating material for closing the open front. The housing H has a top 15, back portion 16, and side portions 17 and 18 which define the aforementioned open front and bottom. It is to be noted that some designs (not shown) of housed fuse cutouts are made with the top open to afford a double venting of the fuse. Mounted in the rear wall 16 of the housing and facing outwardly therefrom, in intermediate position between the top and bottom of the cutout, is a hanger 19 by which the cutout is conveniently mounted to a crossarm or the like.

Means for mounting a closure assembly 30 to the housing H are provided by conventional trunnions 31 on the bottom side walls of the housing H. A pair of transverse mounting pins 29 project from contact sleeve 32 to coact with the trunnions 31. The contact sleeve 32 is fixedly mounted to the door D by mounting screws 33 to make a unitary door assembly 30.

Interiorly of the housing H and on the inside of the back wall 16 are a pair of spaced terminal means, the upper terminal means being denominated 22 and the lower terminal means being denominated 23, both of which are adapted to receive electrical conductors such as 20 and 21, respectively, which are here shown semi-diagrammatically.

The upper terminal means includes the upper contact assembly 24 which comprises a generally U-shaped side contact means 25 which is depending from the upper terminal means 22. The lower terminal means 23 includes lower contact means 27 which comprises the side contacts 28 which are generally U-shaped in configuration and adapted to receive and electrically engage a contact sleeve 32 as shall be later described. The foregoing is conventional and well understood in the art.

Fuse tube means is normally disposed to electrically connect the upper and lower contact terminals 22 and 23 and as here shown generally comprises a fuse tube 34 which is open at its bottom end and closed at its upper end by a metallic contact cap 35. Metal contact cap 35, slidably fits within an open ended upper cylindrical contact chamber 50 which will be more fully described hereinafter. A mechanically rupturable thermally responsive fuse link 37 is disposed within the fuse tube 34 and is formed with a head portion which is fixed relative to tube 34 and adapted to engage cap 35 and a tail portion which is fixedly mounted to contact sleeve 32 by means of a suitable thumb screw 38. Thus, the fuse link electrically bridges the upper and lower terminal means 22 and 23 through the contact cylinder 50, cap 35 and contact sleeve 32.

The fuse tube 34 is held in place on the door assembly 30 by the fuse link 37 and by a combination flipout and time delay means 40 mounted on the contact sleeve 32 and a collar 36 mounted on the fuse tube 34. The metallic collar 36 is fixedly mounted upon and near the lower end of tube 34 and is generally annular in shape having chamfered edge surfaces. The collar 36 is further formed with a pair of projecting transverse ears or pins 48 which are slidably mounted in a cooperating open ended guide slot 49 formed in the contact sleeve 32 in axial alignment with fuse tube 34.

The combination flipout and time delay means 40 engages retaining ring 36 and, thus, fuse tube 34 by a roller means 43 which retains the tube in operative position (as shown in Fig. 1) until the fuse link 37 is ruptured. More particularly, the cam roller flipout means comprises a pivotally mounted spring loaded cam segment member 44 which coacts with transverse roller 43 which is rotatably mounted in a horizontal contact sleeve slot 41 formed in the contact sleeve side walls to the left of vertical guide slot 49 as viewed in Fig. 1. The roller 43 is also slidably mounted in a horizontal direction in slot 41. When the fuse link 37 is ruptured, cam member 44 moves downwardly under the influence of a biasing spring and clears roller 43 allowing pins 42 to move to the left in slot 41 thereby allowing sufficient clearance for ring 36 on the fuse tube to pass roller 43 thereby dropping the tube downwardly to an indicating position (shown in dotted lines in Fig. 1). The length of cam surface 44 assures a time delay so that the arcing caused by interruption of the circuit takes place within the fuse tube rather than between the fuse cap 35, the contact chamber 50 and contact 25. The precise operational details of this time delay flipout structure may be found in my co-pending application, assigned to the same assignee, entitled "Dropout Fuse Construction" having Serial No. 726,787 filed April 7, 1958, now United States Patent 2,884,500, issued April 28, 1959.

Means for causing mechanical rupture of link 37 is provided by transversely projecting pins 48 on tube collar 36 which ride in slots 49 when engaged by a link break tool as shall be described. Since the link 37 is fixedly mounted to contact sleeve 32 at point 38 and to the top of the fuse tube 34, the movement of the fuse tube 34 upwardly causes a stress load to be impressed on the weakest portion of the link 37 to rupture the same. To prevent cutting of the link 37, the lower edge of the flipout and time delay means 40 is provided with a transverse boss 46 which engages an intermediate portion of the link tail 37.

Means for moving the entire fuse tube 34 upwardly is provided by a suitable tool 57 (shown in perspective view Fig. 1a). The tool is essentially a lever of bifurcated form, each projection formed with a leading edge formed in a cam surface 58 and a hook-like aperture 59 spaced therefrom as illustrated in the drawings. The apertures 59 are adapted to fit over and engage a pair of pins 47 which are fixedly formed in and project from the side walls of the contact sleeve 32. Downward rocking movement of the handle of tool 57 causes engagement of cam surface 58 with ears 48 on the tube collar 36 causing the latter to ride upwardly in slot 49 imparting, at increased mechanical advantage, a stress upon fuse link 37 causing the latter to rupture.

To keep an electrical contact and thereby prevent arcing between the top of the fuse cap 35 and the upper terminal means 22 during the link break operation, the open ended contact cylinder 50 is formed with a sliding movable transverse contact plate 50b which is loaded by means of a spring 52 to take up the lost motion of the fuse tube in the upward movement thereof. A suitable shunt piece 52 prevents contact plate 50b from dropping out of the interior of the contact cylinder 50 and also provides a convenient shunt path for the electrical current from plate 50b to the cylinder top 50a and to the contact 25. Stop means 35a as shown in Fig. 1, surrounds the tube 34 at its upper end and is of sufficient diameter to prevent the tube 34 from dropping through the contact sleeve 32 after rupture of the fuse link.

Latch means for retaining the fuse tube in latched position during operation of the link break means is provided by a projecting latching face 53 which is fixedly attached to the top of the upper terminal means 22. A latch member 56 is mounted to the door D and extends through a suitable aperture into the cavity formed by pull ring 39 of the door. Latch member 56 is pivotally mounted and loaded by means of spring 55 so that downward movement of the outer extending end of member 56 causes disengaging movement of a hook face 54 from fixed latching face 53 to afford relative movement therebetween. It is apparent that the operation of the latch can be either before or after link break operation thus imparting selectivity to the operation of the link break means. It will be noted that the latch assures that the contact cylinder 50 does not disengage top side contacts 25 during operation of the link break means to assure that the arcing takes place within the interior of the fuse tube.

The sequential operation of the embodiment shown in Figs. 1 and 2 is shown in semidiagrammatic form in Figs. 3 through 5 of the drawings. More particularly, Fig. 3 shows the parts disposed in circuit completing position prior to operation of the link break means. Fig. 4 shows the fuse tube moving upwardly under the influence of the downward movement of the handle of tool 57 thereby compressing spring 51 in the contact cylinder 50, the fuse link 37 having been ruptured by the stress imposed thereon and the flipout and time delay means 40 having started to flip the fuse link 37 from the interior of the tube. Fig. 5 shows the tail of the link 37 disengaged from the interior of the tube, the tube starting to drop downward after removal of the link break tool 57 and release of the cam flipper means 40 from engagement with roller 43, the latch 56 having been actuated downwardly to cause unlatching disengagement from fixed latching face 53 and the closure assembly being removed from the cutout.

Figure 6:
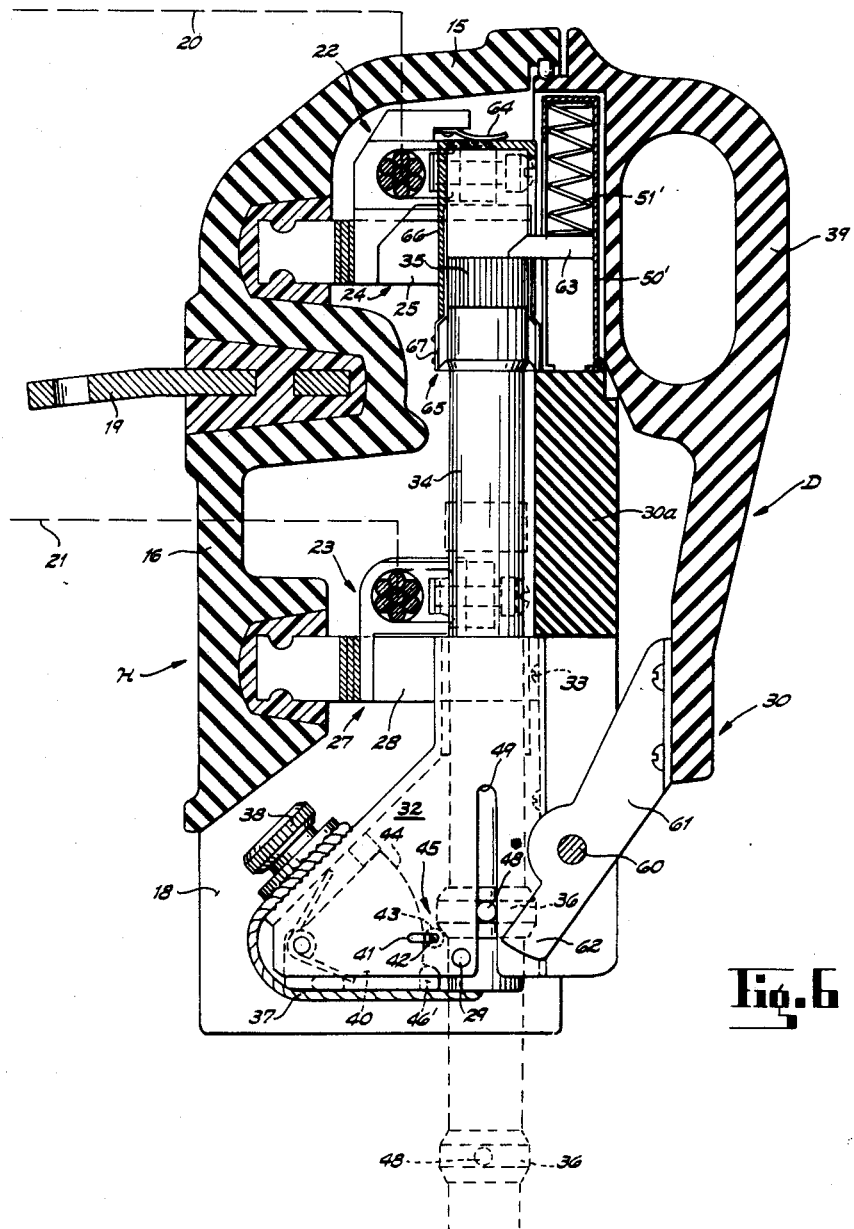
Fig. 6 is a side view, a portion of which is in section, showing an alternative embodiment of fuse cut-outs employing the similar inventive concepts.

The embodiment shown in Fig. 6 of the drawings is quite similar to Fig. 1, the essential differences residing in the fact that the door D is used as the link break tool member rather than utilizing a separate tool, there being an inner door 30a which supports the top contact mechanism and the spring mechanism to maintain contact at the top of the fuse tube is offset from, rather than being in axial alignment with the fuse tube.

More particularly, the door D is formed with a pair of downwardly inwardly directed projections 61 which are pivotally mounted relative to the contact sleeve 32 and inner door 30a on pin 60 and having projecting end portions 62. The disposition of end portion 62 is such that a lever is formed and when the pull ring 39 is engaged by a hook stick or the like the outer portion of the door D will pivot about pin 60 causing end portion 62 to engage projecting pins 48 on retaining member 36 causing the fuse tube to move upwardly thereby imposing a strain by moving the normal fixed upper end of the fuse link 37 relative to the stationary lower end. This causes the link 37 to rupture within the fuse tube 34.

The means for maintaining the electrical contact between the top of the fuse tube and the upper terminal means 22 is provided by a contact cylinder 66 which is mounted on the top of inner door 30a and which is in electrical engagement with side contacts 25 of the upper terminal means 22. Offset to the right as viewed in Fig. 6 is a spring retaining sleeve 50' also mounted on the inner door 30a and having an extending dog 63 which engages the top of the contact cap 35 to bias the latter downwardly. The dog 63 rides upwardly in a suitable slot in sleeve 50' compressing a loading spring 51'. Entrance to the interior of contact cylinder 66 is provided through the bottom of the contact cylinder which has suitable light spring inserts 67 which tend to provide good electrical engagement with the metallic portions of the cap 35. Pressure for dropout movement of the fuse tube is provided by the relatively stronger loading spring 51' through dog 63 which overcomes the side contact springs 67.

Sufficient frictional latching pressure is provided by a leaf spring 64 which is attached to the upper terminal means 22 for engagement with the top of the contact cylinder 66. Latch spring 64 is so adjusted that the link break mechanism causes breakage of link 37 prior to the frictional release of the latch 64 to allow the entire contact cylinder and closure assembly to remove itself from the cutout by pivoting about suitable trunnions (not shown) on pins 29 which mount the closure assembly within the cutout in the conventional manner. A major advantage of this particular embodiment is the elimination of the tool required by the earlier described embodiment. It is to be noted that the same movement of tube 34 is utilized in both of the embodiments so far described.

Figure 7:
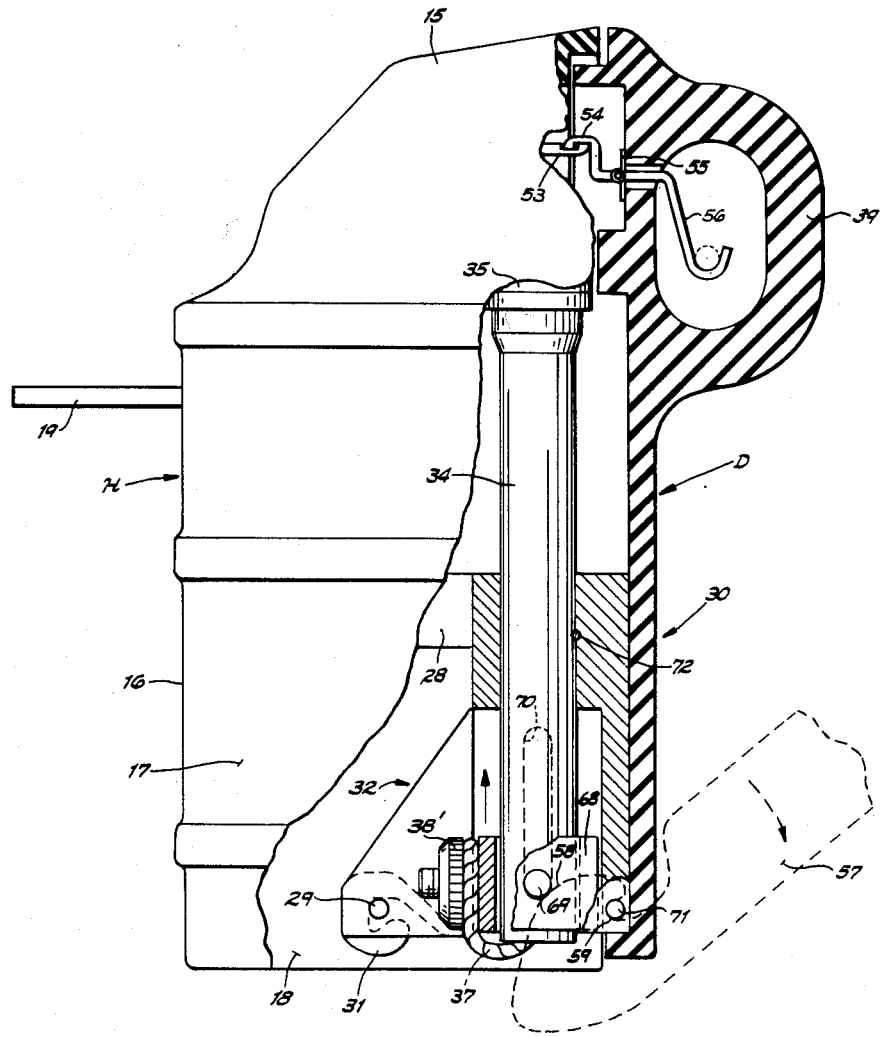
Fig. 7 is a side view, a portion of which is in section, showing a third alternative embodiment employing similar inventive concepts.

The embodiment shown in Fig. 7 of the drawings employs a slightly different means of effectuating link break operation. More particularly, instead of moving the fuse tube and, thus, the upper end of the fuse link and holding the end 38 in fixed position as done in embodiments 1 and 2 aforementioned, in this embodiment the link end mounting means 38' is moved upwardly to move the lower end of the link and the tube 34 and upper end of the fuse link is held stationary. More specifically, the tube 34 is fixedly held relative to the contact sleeve by a pin 72. A movable slide ring 68 is disposed in surrounding relationship to the lower end of the tube and has the mounting means 38' for holding the lower end of fuse link 37 disposed on the inward edge (facing to the left of Fig. 7) mounted thereon. Ring 68 is formed with projecting pins 69 which are adapted to cooperate and be contained by suitable guide slots 70 formed in the side walls of the contact sleeve 32. The contact sleeve 32 is formed with pin 71 at its rearward lower edge (to the right as viewed in Fig. 7) which is offset downwardly relative to pin 69 on collar 68. Thus, when tool 57 is inserted in the cutout, cam surface 58 on the tool 57 will cause the ring 68 to go upwardly moving the lower end of fuse link 37 relative to the fixed upper end thereby imposing pressure on the link to cause rupture of the same. The tube 34 and top of the fuse link remains stationary by virtue of pin 72. The latch means in this embodiment is substantially identical to that shown in Fig. 1 of the drawings.

The operation of the third embodiment is pictorially set forth in Figs. 9 and 10 of the drawing in semidiagrammatic form, Fig. 9 showing the relative position of the parts just prior to imposing of force upon pin 69 with the tool 57 and Fig. 10 showing the breaking of the link and movement of pin 69 upwardly within the guide slots 70.

Figure 11:
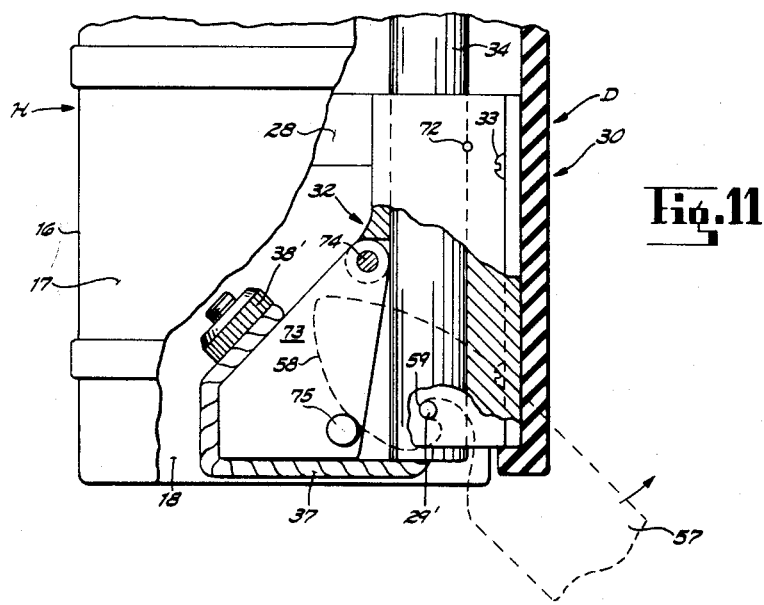
Fig. 11 is a fragmentary sectional view of the operational portion of the fourth alternative embodiment of link break mechanism employing the similar inventive concepts.
Figure 12:
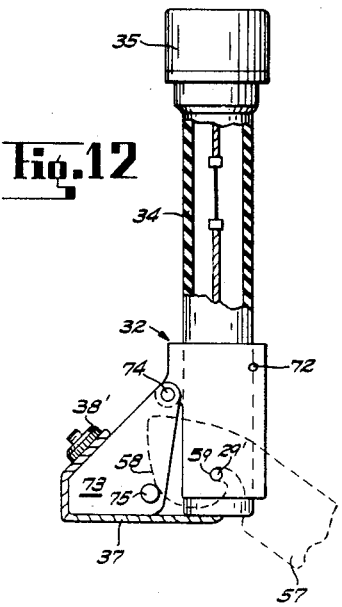
Figs. 12 and 13 are semidiagrammatic views of the fourth embodiment shown in Fig. 11 showing the relative positions of the parts during sequential operation of the device.
Figure 13:
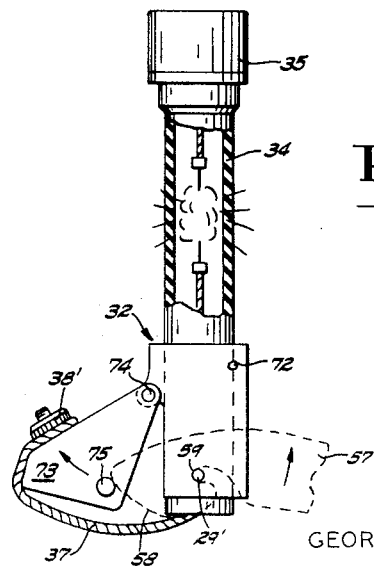

A fourth alternative embodiment employs a slightly different method of breaking the link and is shown in Figs. 11 through 13. In this embodiment, the contact sleeve 32 is formed with a pivotally mounted forward portion 73 wihch is pivoted at the top thereof relative to the stationary portion of contact sleeve 32 about a transverse pin 74. The mounting pins 29' serve the dual function of mounting the closure assembly 30 within the cutout housing and as a location fulcrum pin for mounting the tool 57 which operates against a load imparting pin 75 on the contact sleeve movable portion 73 to impart a mechanical advantage to movable portion 73. As shown, pin 75 is disposed slightly below and offset to the left as viewed in Figs. 11 through 13 from pin 29' such that when the tool 57 is hooked around pin 29', movable portion 73 moves away from the fuse tube, the lower end of the fuse link 37 is moved relative to the fixed upper end thereby imparting pressure upon the rupturable portion of the fuse link 37 causing the same to mechanically rupture.

It will be noted that all four embodiments employ the concept of moving one of the normally fixed ends of the fuse link 37 relative to the other to cause rupture thereof in distinction to fixing both ends and imposing a load intermediate the fixed ends.

Although specific embodiments of the invention have been shown and described, it is with full awareness that many modifications thereof are possible. The invention, therefore, is not to be restricted except as insofar as is necessitated by the prior art and by the spirit of the appended claims.

What is claimed as the invention is:

1. A housed fuse cutout comprising, in combination, a housing, closure means for said housing, a support member affixed to said closure means, interengaging trunnion and bearing means between said housing and said support member, first and second electrical contact means disposed within said housing, fuse means engaging said support member and movable with respect thereto, means for limiting movement of said fuse means with respect to said member, said fuse means electrically bridging said first and second terminal means and including a fuse tube and a mechanically rupturable fuse link within said fuse tube, means for normally fixing the ends of said fuse link relative to said fuse tube and to each other, link break means including first means fixed relative to said closure means and to one of said fuse link ends, second means movable relative to said first means and operatively associated with one of said fuse link ends, elongated operator means pivotally supported on said first means and operatively engaging said second means for displacing said one end of said fuse link relative to the other end of said fuse link to rupture said fuse link, said fuse tube being normally biased toward a drop out position wherein it is visible from the exterior of said housing, whereby actuation of said elongated operator means initiates said link break means to mechanically rupture said fuse link and subsequent to rupture of said link said fuse tube assumes an indicating position.

2. A housed fuse cutout comprising, in combination, a housing, closure means releasably pivoted on said housing, first and second electrical terminal means disposed within said housing, fuse means electrically bridging said first and second contact means including a fuse tube and a mechanically rupturable fuse link, means for fixing at least one end of said fuse link relative to said housing, link break means including operator means pivotally supported intermediate the ends thereof on said closure means, said operator means having a first end and a second end, said first end of said operator means operatively associated with and displacing the other of said ends of said fuse link relative to said fixed end of said fuse link upon application of a force to said second end of said operator means whereby said displacement of said other end of said fuse link is in a direction opposite to the direction of the applied force.

3. A housed fuse cutout comprising, in combination, a housing, closure means for said housing, first and second electrical contact means disposed within said housing, fuse means electrically bridging said first and second contact means including a fuse tube and a mechanically rupturable fuse link, means for normally fixing the ends of said fuse link relative to said fuse tube and to each other, link break means including first means fixed relative to said closure means, second means movable relative to said first means, said second means being fixed relative to one of said ends of said fuse link and movable relative to the other of said ends, and detachable lever means pivotally supported intermediate its ends on said first means and engaging said second means for displacing one of said fuse link ends relative to the other of said ends to rupture said fuse link.

4. The combination of claim 3 characterized by means releasably latching said closure means to said housing, said latching means being accessible from the exterior of said housing.

5. A housed fuse cutout comprising, in combination, a housing, closure means releasably mounted on said housing, first and second electrical contact means within said housing, fuse means supported on said closure means, and electrically bridging said first and second electrical contact means, said fuse means including a fuse tube and a mechanically rupturable fuse link disposed within said fuse tube, link break means comprising a first member disposed in surrounding relation to a portion of said fuse tube and movable in an axial direction relative to said fuse tube, pin means fixedly attached to said closure means, and detachable tool means pivotally engaging said pin means intermediate the ends of said tool means, one end of said tool means engaging said first member, rotation of said tool means about said pin means displacing said first member axially of said fuse tube, one end of said fuse link being fixedly attached to said first member and the other end of said fuse link being fixed relative to said fuse tube, whereby displacement of said first member by said tool means ruptures said fuse link.

6. A housed fuse cutout comprising, in combination, a housing, closure means releasably mounted on said housing, first and second electrical contact means within said housing, fuse means supported on said closure means, and electrically bridging said first and second electrical contact means, said fuse means including a fuse tube and of mechanically rupturable fuse link disposed within said fuse tube, link break means comprising a first member fixed to said fuse tube and a second member pivotally attached to said first member and movable in a direction away from said fuse tube, detachable, lever means pivotally supported intermediate the ends thereof on said first member and having an end in engagement with said second member, respective ends of said fuse link being fixedly attached to said second member and said fuse tube, pivotal movement of said lever means moving said second member away from said fuse tube whereby movement of said second member displaces one end of said fuse link relative to other of said ends to rupture said fuse link.

7. A housed fuse cutout comprising, in combination, an enclosure, a support member releasably pivoted on said enclosure closure means including relatively movable inner and outer portions, said inner portion being fixedly attached to said support member, relatively spaced electrical contacts within said enclosure, fuse means electrically bridging said spaced contacts and including a fuse tube and a mechanically rupturable fuse link within said fuse tube, said fuse tube being supported from and movable relative to said support member, link break means including a lever pivotally supported intermediate its ends on said inner portion of said closure means, said lever being connected at one end to said outer portion of said closure means and having the other end in engagement with said fuse tube, one end of said fuse link fixed to said fuse tube and the other end of said fuse link fixed to said support member, movement of said outer portion of said closure means actuating said lever to displace said fuse tube relative to said support member whereby movement of said fuse tube stresses said fuse link to mechanically rupture said fuse link.

8. A housed fuse cutout comprising a housing having a back portion and a pair of side portions leaving the bottom and front of the said housing exposed, first and second electrical terminal means disposed within said housing, closure means for said cutout adapted to close the open front of said housing, fuse means disposed within said housing on said door means for electrically bridging said first and second terminal means and including elongated fuse tube means and mechanically rupturable fuse link means therewithin having first and second ends extending exteriorly thereof, means within said housing and on said closure means for normally fixing each of said first and second ends relative to said fuse tube and to each other, link break means including a first pair of pins transversely disposed relative to the long axis of said fuse tube and operatively associated with one of the normally fixed ends of said mechanically rupturable fuse link means and operator means comprising bifurcated lever means engageable with said first pair of transverse pins, said first pair of transverse pins being operable to move one of said first and second normally fixed ends of said fuse link means relative to the other, a second pair of transverse pins mounted on said closure means and engageable by said lever means, said lever means pivotally engaging said second pair of transverse pins to cause movement of said first pair of pins to, in turn, stress said fuse link means and thereby mechanically cause rupture thereof.

References Cited in the file of this patent

UNITED STATES PATENTS

| | | |
|---|---|---|
| 2,310,466 | Schultz et al. | Feb. 9, 1943 |
| 2,735,911 | Sant | Feb. 21, 1956 |
| 2,820,868 | McCloud | Jan. 21, 1958 |
| 2,829,218 | Harder | Apr. 1, 1958 |
| 2,835,764 | Earle | May 20, 1958 |
| 2,836,681 | Bracey | May 27, 1958 |

UNITED STATES PATENT OFFICE
CERTIFICATE OF CORRECTION

Patent No. 2,955,176                         October 4, 1960

George R. McCloud

It is hereby certified that error appears in the printed specification of the above numbered patent requiring correction and that the said Letters Patent should read as corrected below.

Column 7, line 63, for "of mechanically" read -- a mechanically --.

Signed and sealed this 11th day of April 1961.

(SEAL)
Attest:
ERNEST W. SWIDER

Attesting Officer

ARTHUR W. CROCKER
Acting Commissioner of Patents